Aug. 12, 1952 P. J. BURDULIS 2,606,723
MACHINE FOR WINDING ARMATURES
Filed Dec. 7, 1948 4 Sheets-Sheet 1

INVENTOR
Peter J. Burdulis
BY
ATTORNEYS

Aug. 12, 1952   P. J. BURDULIS   2,606,723
MACHINE FOR WINDING ARMATURES
Filed Dec. 7, 1948   4 Sheets-Sheet 3

INVENTOR.
Peter J. Burdulis
BY
ATTYS

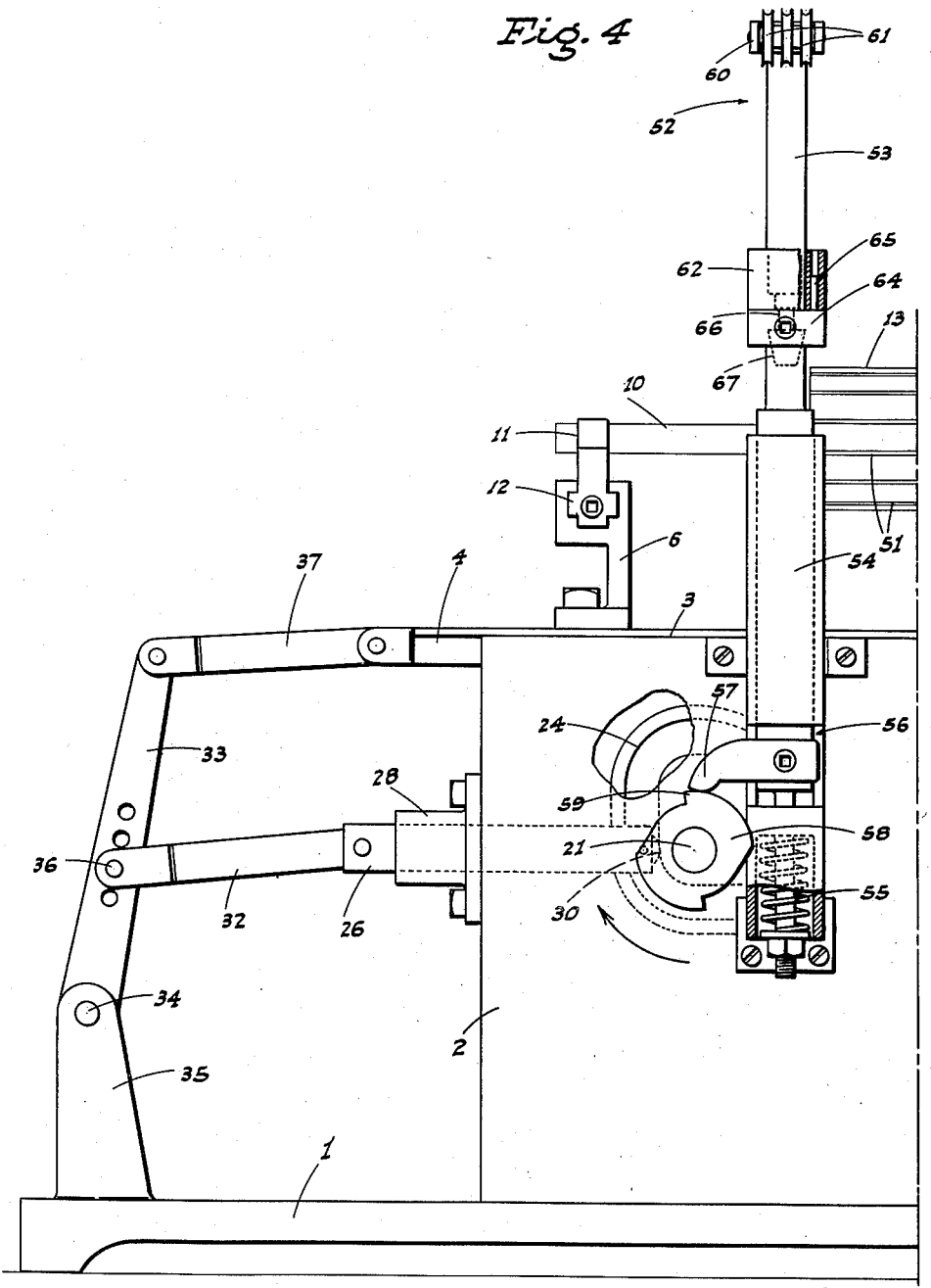

Patented Aug. 12, 1952

2,606,723

UNITED STATES PATENT OFFICE 2,606,723

MACHINE FOR WINDING ARMATURES

Peter J. Burdulis, Delhi, Calif.

Application December 7, 1948, Serial No. 63,881

6 Claims. (Cl. 242—13)

The present invention represents improvements in automatic machines for winding armatures, and is especially designed, but not limited, for use on automotive type armatures as in motor vehicle generators or starter motors; the invention reflecting certain modifications over the machine shown in my Patent No. 2,568,945, dated September 25, 1951.

One object of this invention is to provide a machine for winding armatures, which includes novel mechanisms, adapted to function in predetermined timed relation, to longitudinally reciprocate a supported armature for wire deposit in the armature slots; to lower the fed wires beyond each end of said supported armature to assure of full engagement of the wires in the armature slots; and to circumferentially oscillate the armature a part turn for correct wire spanning between generally opposed slots.

Another object of the invention is to provide a machine for winding armatures, which is electric motor driven, and includes novel timed drive means for the above mechanisms which longitudinally reciprocate and circumferentially oscillate the supported armature, alternately; and the mechanism which causes lowering of the fed wires beyond the ends of the armature.

A further object of the instant invention is to provide a machine for winding armatures, as in the preceding paragraph, wherein said drive means includes a novel, power driven cam assembly; the latter including a plurality of simultaneously driven cams acting in predetermined timed relation to each other whereby the machine functions, on each cycle thereof, through successive operating steps, smoothly, positively, and effectively.

An additional object of the invention is to provide a machine for winding armatures, which is designed for substantially fool-proof operation; the construction of the machine being such that it requires a minimum of servicing or repair, while providing long life for the intended purpose.

It is also an object of the invention to provide the machine with an automatic, electric motor shut-off device operative upon winding of a predetermined number of turns of wire between generally opposed slots of a supported armature; such shut-off device thereby eliminating the necessity of the operator counting the turns of wire and manually stopping the machine after a predetermined number of such turns have been applied to the armature.

A further object of the invention is to provide a practical and reliable machine for winding armatures, and one which will be exceedingly effective for the purpose for which it is designed.

These objects are accomplished by means of such structure and relative arrangement of parts as will fully appear by a perusal of the following specification and claims.

In the drawings:

Fig. 4 is a fragmentary rear elevation of the machine.

Figure 1:
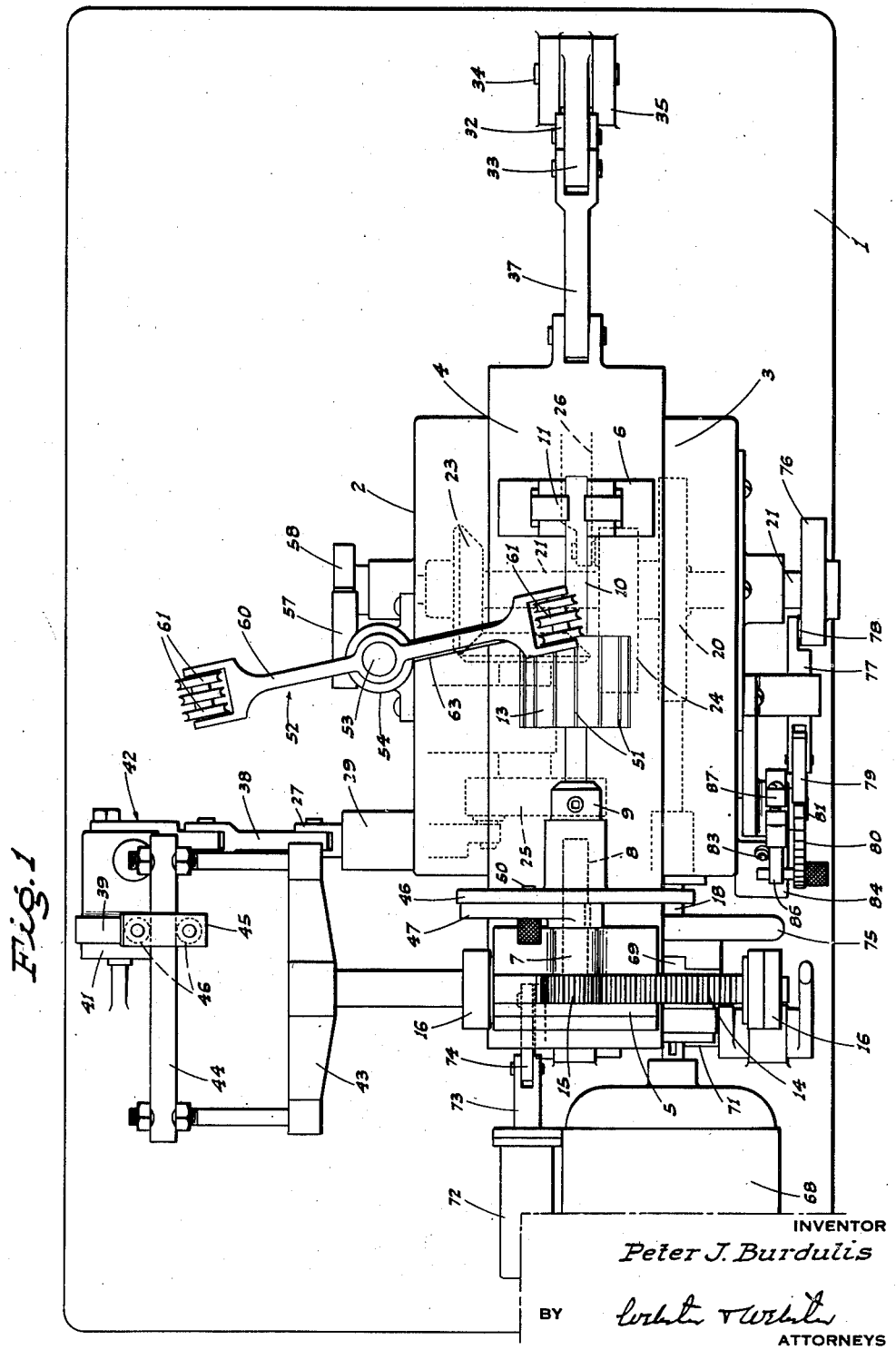
Fig. 1 is a top plan view of the machine.
Figure 2:
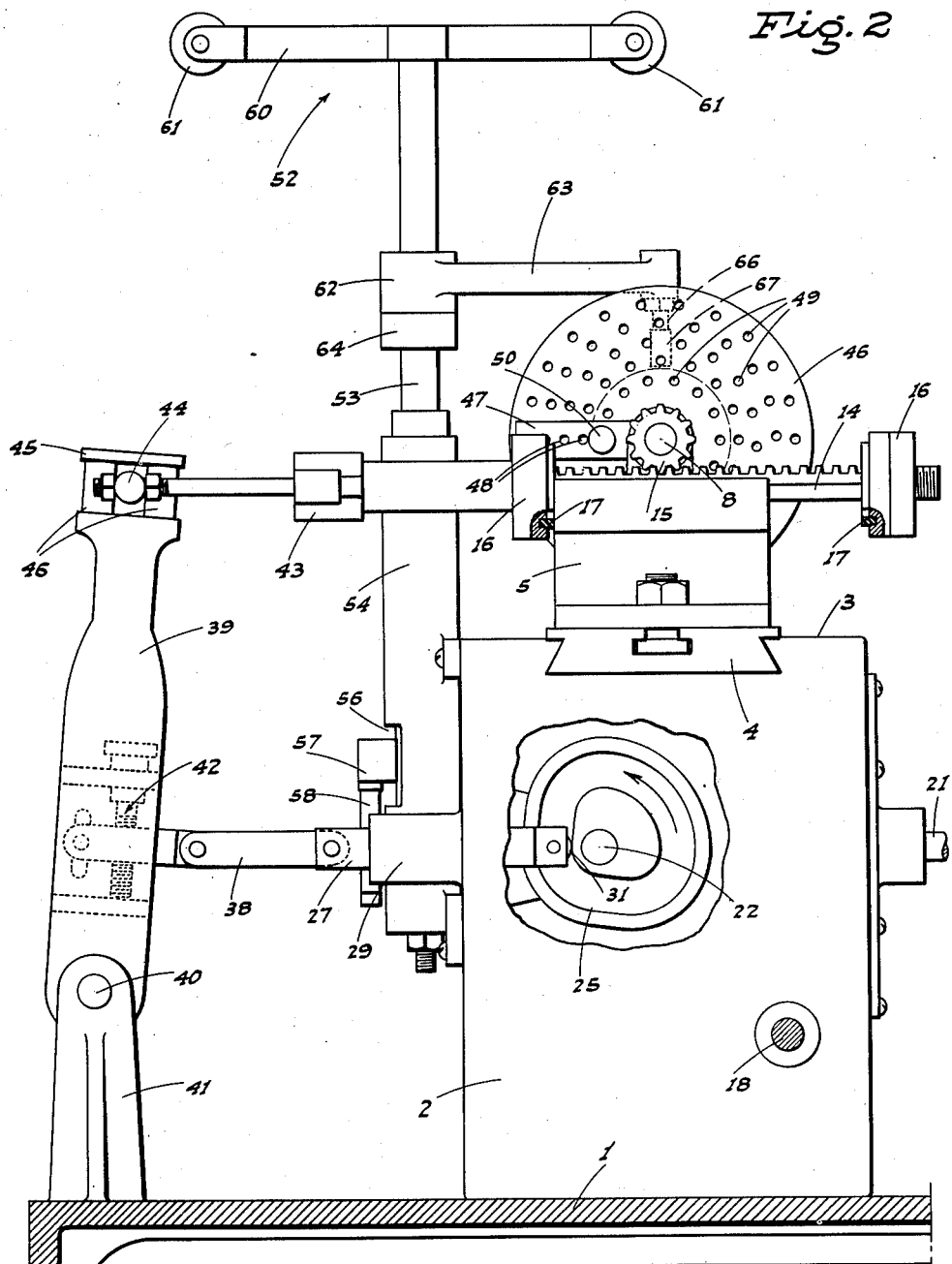
Fig. 2 is an end elevation of the machine taken from its drive end; the electric motor and adjacent drive mechanism being broken away.
Figure 3:
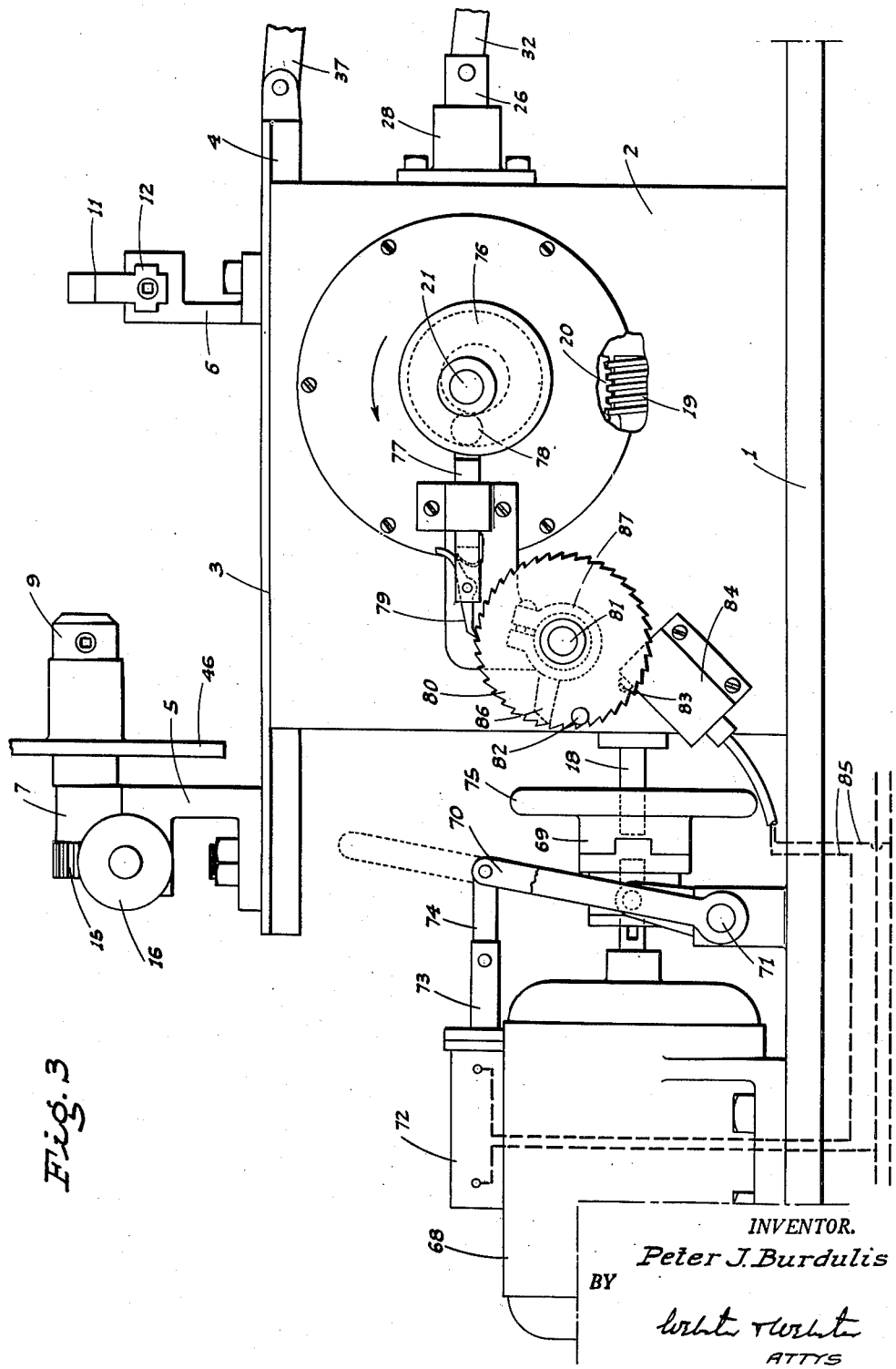
Fig. 3 is a front elevation of the machine.

Referring now more particularly to the characters of reference on the drawings, the machine comprises a heavy-duty, horizontal base 1, such base being of substantial size, rectangular, and somewhat elongated.

Substantially centrally of its ends, and adjacent but short of its rear edge, the base 1 is fitted with an upstanding housing 2, and the top of such housing forms a bed 3.

A horizontal, longitudinal slide 4, adapted for lengthwise reciprocation, is mounted in the bed 3 of the upstanding housing 2, and such slide 4 carries the armature supporting structure, which is as follows:

Adjacent opposite ends thereof the slide 4 is fitted with relatively short standards 5 and 6; the standard 5 including a bearing 7 in which a relatively short shaft 8 is journaled; said shaft projecting on opposite sides of said bearing. At its inner end the shaft 8 supports a chuck 9 for the reception of one end of an armature shaft 10 in gripped relation. The standard 6 supports a cradle 11 which receives the other end portion of the armature shaft 10; the cradle 11 being adjustably mounted, as at 12. With the above arrangement an armature 13 is positively supported by the chuck 9 and cradle 11, with the armature shaft 10 in a horizontal, longitudinal position for rotation by said chuck 9.

The standard 5, outwardly of the bearing 7, is fitted with an upwardly toothed transverse rack 14 disposed for horizontal reciprocation. The outer end of the shaft 8 carries a pinion 15 which meshes with the rack 14 whereby reciprocation of the latter is translated into circumferential oscillation of the shaft 8, and supported armature 13. Stop heads 16 on the rack 14 on opposite sides of the standard 5 limit the travel of the rack 14; such stop heads including bumpers 17 for engagement with said standard 5.

Each cycle of operation of the machine includes two opposed reciprocating strokes of the armature 13 and two opposed part-turn oscillating movements of said armature, with said strokes and movements in alternate relation.

The mechanism employed to actuate the slide 4 and rack 14 to accomplish the above cycle are as follows:

An input drive shaft 18 extends horizontally into the housing 2 from one end thereof, and in such housing the shaft 18 is fitted with a worm 19 which drives a worm gear 20 from below. The worm gear 20 is fixed on a cross shaft 21, and in turn such cross shaft 21 drives a longitudinal, horizontal countershaft 22 by means of a bevel gear unit 23. A cam 24, of internal type, is fixed on the cross shaft 21 between the worm gear 20 and the bevel gear unit 23. Another cam 25, likewise of internal type, is fixed on the countershaft 22 in generally the transverse vertical plane of the chuck 9.

Plungers 26 and 27 project horizontally into the housing 2 through guide bosses 28 and 29 generally radially of the cross shaft 21 and countershaft 22, respectively; such plungers including corresponding rollers 30 and 31 which ride in the cams 24 and 25, respectively. As so mounted the plunger 26 works lengthwise of the machine, while the plunger 27 works transversely thereof. The cams 24 and 25 are each generated with dwells approximately 90° apart, and said cams are fixed on their respective shafts so that when one cam is in its dwell the other is acting to reciprocate the corresponding plunger 26 or 27. In other words, when one of the plungers is being power thrust inwardly or outwardly, the other plunger is stationary, and at one end of its stroke. This timed reciprocation of the plungers 26 and 27 is converted into timed alternate reciprocation of the slide 4 and rack 14, as follows:

At its outer end the plunger 26 is pivotally linked, as at 32, to an upstanding swing lever 33 pivoted, at its lower end, as at 34, to a mount 35 on the base; the swing lever 33 moving in a longitudinal vertical plane. The link 32 is adjustably pivotally connected, as at 36, to the lever 33, whereby to alter the effective stroke of the latter.

At its upper end the swing lever 33 is pivotally linked, as at 37, to the adjacent end of the slide 4. With this arrangement, powered reciprocation of the plunger 26, which comprises a stroke in each direction with a dwell therebetween, accomplishes corresponding reciprocation of said slide 4.

The plunger 27 is pivotally linked, as at 38, to an upstanding swing lever 39 pivoted, at its lower end, as at 40, to a mount 41 which upstands from the base 1; said lever 39 being pivoted for swinging movement in a transverse vertical plane. The linkage 38 is adjustably connected to the swing lever 39, as at 42, whereby the effective throw of said lever may be selectively altered.

At its upper end the swing lever 39 is connected to the adjacent end of the rack 4 by means of an open cross head 43, which includes an exposed, longitudinally extending slide bar 44 which runs through a guide box 45 on the upper end of swing lever 39. The guide box 45 includes spaced anti-friction rollers 46 which engage on opposite sides of the slide bar 44. With this arrangement, swinging of lever 39 in a transverse vertical plane effects sliding motion of the rack 14, while permitting of the slide 4, with the rack 14 mounted thereon, to reciprocate lengthwise of the machine without interference; the slide bar 44 then running freely through the guide box 45.

The extent to which the armature 13 rotates with reciprocation of the rack 14 is regulated by the following indexing device:

Between the chuck 9 and bearing 7 a circular index plate 46 is journaled on the shaft 8, being initially free thereon. The chuck 9 is fixed in connection with the index plate 46 for rotation therewith. Between the index plate 46 and bearing 7 the shaft 8 carries a fixed, radial index arm 47; such index arm 47 having a radial row of spaced holes 48 therein, each of which holes is adapted to register selectively with one of the holes in a corresponding row of circular holes 49 in the index plate 46. A headed index pin 50 engages selectively through any one of the holes 48 in index arm 47, and a selected and matching one of the holes 49 in the index plate 46. With this indexing device, the part-circle rotation of the chuck 9 and supported armature 13, which results upon each stroke of the rack 14, can be preselected so as to alternately dispose generally opposed armature slots 51 uppermost.

The wire guide unit of the machine, indicated generally at 52, comprises a post 53 which upstands from the back of the housing 2 in a transverse vertical plane generally centrally between the chuck 9 and armature shaft cradle 11. The lower end portion of the post 53 is supported, in vertically guided, non-turnable relation, in an upstanding guide sleeve 54 affixed to the housing 2 at the back. At its lower end the post 53 is counter-balanced by a compression spring unit 55, and above such unit the sleeve 54 is open and in such opening 56 a finger 57 is secured to the post. The finger 57 extends laterally from the post 53 and rides a cam 58 which includes a pair of fall-off points 59 approximately 180° apart. With this arrangement the finger 57 rides the cam 58, holding the post 53 in a normally raised position; the timing being such that the post 53 is so raised as the armature 53 reciprocates on one stroke or the other. However, immediately at the end of such reciprocating stroke of the armature 13, the finger 57 falls off one of the points 59 of cam 58, resulting in a relatively short drop of said post 53, which drop is for a purpose hereinafter described:

At its upper end the post 53 is fitted with a cross arm 60, the forward end of which directly overhangs the path of reciprocation of the armature 13. At opposite ends the cross arm 60 carries wire guide pulleys 61.

Below the cross arm 60 the post carries a slide collar 62 having a forwardly projecting radial arm 63 thereon; the collar 62 normally resting on another collar 64 vertically adjustably disposed on the post.

A coupling pin 65 upstands from the collar 64 and is received in a matching socket in the collar 62. This prevents lateral motion of the forwardly projecting radial arm 63, but does not limit its upward movement by hand should necessity demand. As the collar 64 is adjustable, likewise is the radial arm 63.

A short neck 66 depends from the outer end of the radial arm 63, and at its lower end said neck is fitted with a wire guide head 67.

During operation of the machine wire from supply spools (not shown) extends upwardly over the rear pulleys 61, thence passes forwardly to and over the front pulleys 61, and depends to and through the guide head 67, which guide head 67 is normally disposed very close to the path of reciprocation of the armature 13, and in vertical alinement with the armature shaft.

The input drive shaft 18 is driven, during operation of the machine, from an electric motor 68 mounted on the base 1 in driving relation to said input drive shaft 18 by means including a clutch 69 adapted to be engaged or disengaged by a clutch control lever 70 pivoted, as at 71, and upstanding therefrom for manipulation. The clutch 69 is initially engaged by manual actuation of the lever 70 in the direction of the housing 2, and is arranged for disengagement by means of a solenoid 72 mounted adjacent the motor 68. The solenoid plunger 73 is pivotally linked, as at 74, to the lever 70, whereby upon energization of the solenoid 72 its plunger 73 pulls the lever 70 in a direction away from the housing 2, disengaging the clutch 69. The solenoid 72 is automatically energized, at predetermined times during the operation of the machine, in the manner hereinafter described.

A hand wheel 75 fixed relative to the input drive shaft 18 permits of the manual operation of the driving means of the machine at the start, whereby to properly dispose of all of the working parts in proper position.

In operation of the above described machine, the armature 13 is first mounted in supported position on the slide 4 by securing said armature in connection with the chuck 9 and cradle 11; the indexing device comprised of index plate 46, index arm 47, and index pin 50 then being adjusted to correspond to the type and size of the armature.

Thereafter the wires are threaded on the wire guide unit 52, as above described, and lead from the head 67 downwardly.

The electric motor 68 is then placed in operation, and through the medium of the cam actuated driving mechanisms heretofore described, the supported armature is repeatedly reciprocated longitudinally and oscillated circumferentially, alternately, in a wire receiving cycle. As the armature thus reciprocates and oscillates below the wire guide head 67, the wire is fed into generally opposed slots 51 of the armature, with the wire looping between said slots at the armature ends. The purpose of the dropping or lowering of the post 53 and the wire guide head 67 at the end of each reciprocating stroke of the armature, which dropping is caused by the fall-off cam 58, is to assure that the wire as fed from said head 67 into the adjacent slot 51 is in full engagement therein before said armature starts its next following circumferential oscillating movement.

The cam 58 raises the post 53 and guide head 67 back to its normal position before the armature again reciprocates lengthwise.

After a predetermined number of turns of wires have been wound or looped between generally opposed slots 51 of the armature 13, the solenoid is automatically energized to cause disengagement of the clutch 69, and this is accomplished as follows:

Exteriorly of the housing 2 and at the front thereof, the cross shaft 21 is fitted with a cam 76 which actuates a guided plunger 77 by means of a roller 78 on said plunger riding in the cam. The cam 76 is generated so that it advances the plunger 77 once with each full revolution of the cross shaft 21, which corresponds to the winding of one loop of wire about the armature 13. The plunger 77 carries a spring pressed pawl 79 which works in cooperation with a ratchet wheel 80 fixed on a stub shaft 81 journaled in connection with the adjacent side of the housing 2.

A pin 82 projects laterally inwardly from the ratchet wheel 80 adjacent its periphery, and said pin is adapted to engage, with rotation of the ratchet wheel 80, with the push button 83 of a normally open micro-switch 84 mounted on the housing 2. When the pin 82 engages and depresses the button 83, the switch 84 is closed, such switch in turn, by reason of its interposition therein, closing the circuit 85 of the solenoid 72. The moment that the solenoid 72 is energized, its plunger 73 retracts, swinging the lever 70 in a direction to disengage the clutch 69.

At the outset of each winding operation the pin 82 is raised or backed away from the button 83 a distance predetermined by the notches of wheel 80 corresponding to the number of loops of wire to be wound on the armature. So that this resetting of the ratchet wheel 80 can be readily accomplished, and to the same extent for each winding operation, a stop 86 is disposed in the path of the pin rearwardly thereof; such stop 86 being mounted on a collar 87 adjustably mounted on a hub which projects from the housing 2. Thus, dependent upon the adjusted position of the stop 86, the number of turns to be wound on the armature with each operation is easily predetermined by merely rotating the ratchet wheel 80 backwards until pin 82 abuts stop 86.

The machine for winding armatures, as described in the foregoing specification, provides a practical and reliable device for the purpose; the machine operating accurately and smoothly for the application of windings to armatures with a predetermined number of turns to each winding, and with automatic stoppage of the machine after each set of turns has been applied.

The machine is relatively simple in its setting and operation, requiring no special skill on the part of the operator to wind armatures properly.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A machine for winding armatures, comprising a support, means on the support adapted to mount an armature for axial reciprocation and circumferential oscillation, mechanisms operative to impart reciprocating strokes and oscillatory movements to the armature alternately in a predetermined wire receiving cycle, and a wire guide unit including a wire guide head mounted adjacent but normally out from the axial path of the armature whereby to feed wire to the latter through said cycle; the armature being mounted with its axis horizontal, and said wire guide unit including a post upstanding from the support to one side of said path, an arm projecting rigidly from the post across and above the armature, the wire guide head being mounted in dependent position in connection with the arm adjacent its outer end, and a wire guide pulley mounted on the post above the wire guide head.

2. A machine for winding armatures, comprising a support, means on the support adapted to mount an armature for axial reciprocation and circumferential oscillation, mechanisms operative to impart reciprocating strokes and oscillatory movements to the armature alternately in a predetermined wire receiving cycle, and a wire guide unit including a wire guide head mounted adjacent but normally out from the axial path of the armature whereby to feed wire to the latter through said cycle; the armature being mounted with its axis horizontal, and said wire guide unit including a post upstanding from the support to one side of said path, an arm projecting rigidly from the post across and above the armature, the wire guide head being mounted in dependent position in connection with the arm adjacent its outer end, and means mounting the arm for vertical adjustment on the post and comprising a collar on the arm slidably engaging the post, another collar vertically adjustable on the post below said first named collar, and means between the collars preventing relative rotation therebetween without restricting upward sliding of said first named collar.

3. A machine for winding armatures, comprising a support, means on the support adapted to mount an armature for axial reciprocating motion and circumferential oscillation, an electric motor unit mounted on the support, actuating mechanism connected between the motor unit and said mounting means operative to impart reciprocating strokes and oscillatory movements to the armature alternately in a predetermined wire receiving cycle, and a wire guide unit mounted adjacent the armature whereby to feed wire to the latter through said cycle; the motor unit including a normally engaged clutch, and means responsive to said actuating mechanism operative to automatically cause disengagement of the clutch after a predetermined number of said cycles, said last named means including an electrically actuated clutch disengaging device, a circuit for said device, a control switch in the circuit, a cam actuated pawl and ratchet wheel unit responsive step by step to said actuating mechanism, said steps corresponding to the wire winding cycles, and an element on the ratchet wheel positioned to engage and operate the switch after predetermined rotation of said ratchet wheel.

4. A machine for winding armatures, comprising a support, means on the support adapted to mount an armature for axial reciprocation and circumferential oscillation, mechanism operative to impart reciprocating strokes and oscillatory movements to the armature alternately in a predetermined wire receiving cycle, and a wire guide unit including a wire guide head mounted adjacent but normally out from the axial path of the armature whereby to feed wire to the latter through said cycle; the armature being mounted with its axis horizontal, and said wire guide unit including a guide sleeve mounted on the support laterally out from the axial path of the armature, a post supported in vertically guided but non-turnable relation in the sleeve, the sleeve being provided with a side opening adjacent its lower end, a counter-balancing spring interposed between the post and the sleeve at a point below said opening, a finger on the post projecting through said opening, a cam journaled on the support, said finger being engageable with said cam, means to operate said cam in timed relation to the reciprocation of the armature whereby to engage said finger and lift the post prior to reciprocating motion of the armature, an arm projecting from the post above the sleeve, such arm projecting to a point above the armature, a wire guide head on the outer end of the post, and a wire guide pulley assembly mounted on the post above the wire guide head.

5. A machine as in claim 3, in which the ratchet wheel is rotatable by hand in a retroactive direction upon release of the pawl, and a circumferentially adjustable stop in the path of retroactive movement of the switch engaging element whereby the wheel may be initially pre-set for a selected number of step-by-step movements to be imparted thereto before said element engages the switch.

6. In an armature winding machine, a shaft, mechanisms to reciprocate the shaft and alternately oscillate the same through an arc of predetermined length, a chuck to support an armature shaft mounted in axial alinement with but separate from the first named shaft, an index plate fixed with the chuck, a radial index arm fixed with the first named shaft, the index plate for the extent of said arc having a plurality of concentric rows of holes, each row having a different number of equally spaced holes, and the index arm having a single row of holes to register with said rows, and a pin removably projecting in connecting relation through any one of the arm holes and one of the corresponding row of plate holes.

PETER J. BURDULIS.

REFERENCES CITED

The following references are of record in the file of this patent:

UNITED STATES PATENTS

| Number | Name | Date |
|---|---|---|
| 356,619 | Chase | Jan. 25, 1887 |
| 592,454 | Stacy | Oct. 26, 1897 |
| 810,353 | Salzer et al. | Jan. 16, 1906 |
| 1,504,253 | McCord | Aug. 12, 1924 |
| 2,381,750 | Hunsdorf | Aug. 7, 1945 |